United States Patent

[11] 3,613,081

[72] Inventor Naoki Morimoto
Tokyo, Japan
[21] Appl. No. 791,739
[22] Filed Jan. 16, 1969
[45] Patented Oct. 12, 1971
[73] Assignee Fujitsu Limited
Kawasaki, Japan
[32] Priority Jan. 18, 1968
[33] Japan
[31] 43-2744

[54] PATTERN RECOGNIZING CIRCUIT
1 Claim, 13 Drawing Figs.

[52] U.S. Cl. .......... 340/146.3H, 340/146.3 J
[51] Int. Cl. .......... G06k 9/04
[50] Field of Search .......... 340/146.3

[56] References Cited
UNITED STATES PATENTS

| | | | |
|---|---|---|---|
| 3,245,037 | 4/1966 | Brust et al. | 340/146.3 |
| 3,290,650 | 12/1966 | Bailey, Jr. et al. | 340/146.3 |
| 3,293,604 | 12/1966 | Klein et al. | 340/146.3 |
| 3,418,633 | 12/1968 | Jones et al. | 340/146.3 |

*Primary Examiner*—Maynard R. Wilbur
*Assistant Examiner*—William W. Cochran
*Attorneys*—Curt M. Avery, Arthur E. Wilfond, Herbert L. Lerner and Daniel J. Tick

ABSTRACT: A position sector determining circuit of a pattern recognizing circuit is connected to pattern scanning apparatus and determines the distance between a side of a polygon forming a polygonal area enclosing the pattern and an edge of a line segment of the pattern closest the side.

PATTERN RECOGNIZING CIRCUIT

DESCRIPTION OF THE INVENTION

The present invention relates to a pattern recognizing circuit. More particularly, the invention relates to a position sector determining circuit for determining the position sector of each line segment of a pattern.

In a pattern or character recognizing circuit, the sector or area in which each determined line segment or stroke of the pattern appears is initially determined. The entire pattern or character is thereafter recognized, identified or determined. In a conventional distance or position sector determining circuit, a fixed observation sector is utilized. The area or sector under observation is fixed, however, and cannot be varied in accordance with variations in the size or dimensions of the pattern or character. Normally, a pattern or character varies in the thickness of its lines, line segments and dimensions or size, depending upon the manner of inking at the time that the pattern is printed by suitable printing or typing apparatus.

The principal object of the present invention is to provide a new and improved pattern recognizing circuit.

An object of the present invention is to provide a new and improved distance or position sector determining circuit for a pattern recognizing circuit.

An object of the present invention is to provide a distance or position sector circuit for a pattern recognizing circuit, which distance determining circuit functions with efficiency, effectiveness and reliability.

An object of the present invention is to provide a distance or position sector determining circuit which functions with accuracy regardless of variation of the line thickness of a pattern being recognized.

In accordance with the invention, a pattern recognizing circuit comprises scanning means for scanning a character and producing scanning signals in accordance with the character. A positioning circuit connected to the scanning means provides a quadrilateral circumscribed about the character in accordance with the scanning signals. A position sector determining circuit connected to the positioning circuit provides a plurality of sectors in the quadrilateral and positions the sectors by utilizing the four sides of the quadrilateral as a reference. The position sector determining circuit comprises means for measuring the distance between each of the line segments which determine the character and the one of the four sides of the quadrilateral which is parallel to the line segment and nearest to the line segment. The position sector determining circuit produces output signals representing the sectors. An edge detecting circuit coupled to the scanning means detects the edges of the character from the scanning signals and produces edge detecting signals in accordance therewith. A line determining circuit connected to the position sector determining circuit and to the edge detecting circuit determines the line segments of the character and the positions of the line segments in accordance with the output signals of the position sector determining circuit and the edge detecting signals. A pattern indicating circuit connected to the line determining circuit determines the character in accordance with the determinations of the line determining circuit.

In order that the invention may be readily carried into effect, it will now be described with reference to the accompanying drawings, wherein:

FIGS. 1*a* and 1*b* are schematic diagrams of patterns illustrating an inherent deficiency of a conventional position sector determining system;

Figure 1A:
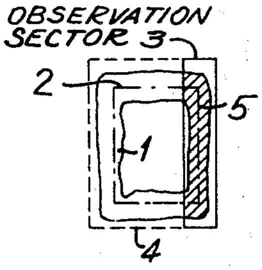
Figure 1B:
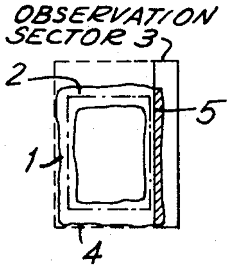

FIG. 1*a* and 1*b* illustrate the observation of the line segments 1 of a pattern or character 2 via a quadrilateral sector 3 which has a substantially longer vertical than horizontal dimension. FIGS. 1*a* and 1*b* illustrate the determination of the signal component of the right vertical line segment of the pattern, as illustrated by hatching, and as appearing in the observation sector.

The illustrated method of recognizing a pattern or character by determining or detecting the vertically longer, or horizontally longer, line segment of said pattern is usually known as the stroke method. In the stroke method, a polygon, which in the case of illustration is a quadrilateral, and more particularly, a rectangular parallelogram, is initially provided around and enclosing the pattern. The polygonal area enclosed by the polygon 4 is divided into a plurality of sectors. The pattern is scanned by any suitable scanning means, and the scanning signals produced as a result of such scanning in each of the sectors, are determined and the line segments are determined or detected therefrom. The line segments are usually determined by a digital circuit which utilizes a counter.

The disadvantage of the line segment determination system of known type is in the provision of the polygonal area enclosing the pattern. That is, since the polygon 4, which encloses the pattern, is normally provided on the basis of the left and lower edges of said pattern, said polygon is unsatisfactory when the line thicknesses of the pattern vary due to any cause such as, for example, nonuniformity of printing. Thus, for example, a line segment 5 of the pattern may become very thin, as shown in FIG. 1*b*. In such a case, the observation sector 3 is incapable of determining or detecting the right vertical line.

In FIG. 1*b*, the right half of the observation sector 3 is blank and is devoid of the line 5. The line segment 5 is thus partially obscured or nonevident in the observation sector 3, as hereinbefore described, when the printed pattern or character is very thick, very thin, very dark or very light or partially so. This is due to the fact that the position sector or observation sector is fixed in position from, for example, the left edge of the enclosing polygon, and because scanning signals are utilized to detect the line segments.

Figure 2:
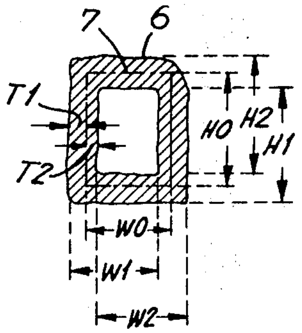
FIG. 2 is a schematic diagram of a pattern illustrating the principle of the position sector determining circuit of the present invention.

The basic principle of operation of the pattern recognizing circuit of the present invention is shown in FIG. 2. In FIG. 2, a pattern or character 6 comprises a plurality of line segments having thicknesses which vary in accordance with variations in printing, as hereinbefore described. When the constant center line 7 is determined, however, the variations in thickness of the line segments may be determined with regard to the relation of the line segment to said center line. When a pattern or character is printed with a normally operating line printer, the hypothetical center line 7 may be considered as conforming substantially to the actual center line. That is, in FIG. 2, the thickness T1 on one side of the center line 7 is substantially equal to the thickness T2 on the other side of said center line.

When the thicknesses T1 and T2 are substantially equal to each other, the following relationships are true:

$$W1 \simeq W0 \simeq W2$$

$$H1 \simeq H0 \simeq H2$$

wherein W0, W1, W2, H0, H1 and H2 are as shown in FIG. 2. These expressions indicate that the distances between the line segments at the edges of the pattern 6 are located on the same side of the center line are substantially independent of the quality of printing.

Figure 3:
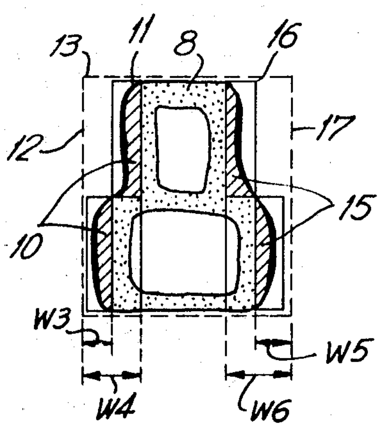
FIGS. 3 and 4 are schematic diagrams of patterns illustrating the position sectors.
Figure 4:
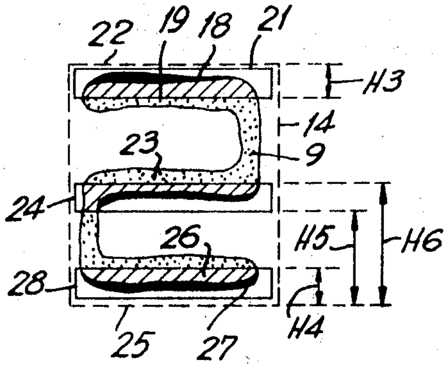

FIGS. 3 and 4 illustrate the position sectors provided in accordance with the principle of operation of the present invention illustrated in FIG. 2. In FIG. 3, a pattern or character 8 is to be determined, whereas in FIG. 4, a pattern or character 2 is to be determined. A signal for detecting or determining the left edge of a line segment 10 of the pattern 8 of FIG. 3 is utilized to detect such line segment, and the position sector or observation sector 11 for observing the left edge is determined with reference to the left side 12 of the polygon 13. The polygon 13 encloses the pattern 8 and is in the form of a rectangular parallelogram or quadrilateral, as is the polygon 14 which encloses the pattern 2 of FIG. 4.

In order to detect the line segment 15 of the pattern 8, a signal is utilized to detect the right edge of said line segment, and an observation or position sector 16 is determined with reference to the right side 17 of the polygon 13. When this system for detecting vertical line segments is utilized, the distances or dimensions W3, W4, W5 and W6, shown in FIG. 3, become constant, and the line segments of the pattern may be detected with great accuracy.

The principal characteristic feature of the invention is the method of measuring the positions of the strokes or line segments of a character to be detected, in recognizing the character. The principle of the method of measurement is explained in the specification with reference to FIG. 2.

In the measurement of, for example, the sector 11 of FIG. 3, the distance from the left side 12 of the polygon 13 is measured, and in the measurement of the sector 16, the distance from the right side 17 of said polygon is measured. In such distance measurement, a constant distance may always be measured for a specific detected character without relation to the thickness of the strokes or line segments of the character. The character in the case of FIG. 3 is "8." The detected character 8 always has a constant size and a constant configuration, but the thickness of the character is sometimes varied due to the amount of ink utilized in the printing, or the quality of the paper. Thus, in accordance with the method of my invention, a stroke or line segment of a specific character may always be detected at the position spaced from a side of the polygon by a constant distance. Therefore, whether or not a stroke may be detected at the same position will serve to discriminate whether or not there is a possibility that the detected character is 8. This is an advantage of the pattern recognizing circuit of the invention.

A stroke or line segment of the character 8 may always be detected at a constant distance from the left side 12 of the polygon 17 in the sector 11, as shown in FIG. 3. In the sector 11, the left edge of the upper left stroke or line segment of the detected character 8 is detected. This is because the relation between the left edge of the upper left stroke or line segment of the 8 and the left edge of the lower left stroke or line segment of the 8 is equivalent to the relation between the left edge of the left stroke and the left edge of the right stroke of FIG. 2.

The stroke or line segment of a specific character may always be detected at a constant position by measuring the distance between the left side of the polygon and the line segment when the sector is placed on the left-hand side of the centerline of the line segment to be detected, and measuring the distance between the right side of the polygon and the line segment when the sector is placed on the right-hand side of the center line. Similarly, the stroke or line segment may be detected at a constant position by measuring the distance from the upper side of the polygon to the line segment or stroke when the sector is placed on the upper side of the center line of the line segment, and measuring the distance from the lower side of the polygon to the stroke or line segment when the sector is placed on the lower side of the center line.

In FIG. 3, the circumscribed polygon is a quadrilateral. It is assumed that the strokes on the right-hand side of the center point of the quadrilateral are substantially parallel to the side 17 of the quadrilateral. Each of the strokes or line segments has two edges. The line segments or strokes are opposed to, or parallel to, the sides 17 and 12 of the circumscribed quadrilateral, but the line segments are closer or nearer to the side 17 than to the side 12. In such line segments or strokes, the distance from the side 17 to the stroke is measured. The distance from the side 17 to one of the two edges of a stroke which is closer to the side 17 than the other end is measured, and such distance is regarded as the distance from the side 17 to the stroke. Thus, when the line segments or strokes are on the right-hand side of the center point of the circumscribed quadrilateral, the distance between the side 17 and the right-hand edge of each stroke is measured, and when the strokes are on the left-hand side of the center point, the distance between the side 12 and the left-hand edge of each stroke is measured.

Although vertical strokes, parallel or opposed to the sides 17 and 12, have been described, the horizontal strokes may be detected in exactly the same manner.

FIG. 4 illustrates the system of the present invention for detecting or determining the horizontal line segments of the pattern 2. The upper edge 18 of the upper line segment 19 is utilized to detect such line segment, and the observation or position sector 21 is determined with regard to the upper side 22 of the polygon 14. The center horizontal line segment 23 may be determined by a signal derived from the under edge of said line segment, via an observation sector 24 which is positioned with reference to the under side 25 of the polygon 14.

The lower horizontal line segment 26 is determined by a signal provided by its under edge 27 via an observation sector 28 which is positioned relative to the under side 25 of the polygon 14. The distances or dimensions H3, H4, H5 and H6, shown in FIG. 4, are always constant, and the horizontal line segments may be determined with great accuracy.

The signals for determining the edges of the line segments of the pattern in the observation or position sector, as hereinbefore described, may be independently derived as a total of four signal lines. The four signal lines are determined by the variation from white to black and from black to white when the pattern is scanned or varied from left to right, or vice versa, and the variation from white to black and from black to white when the character is scanned or viewed from over to under, or vice versa. Suitable circuitry for determining this is disclosed in copending Pat. applications Ser. No. 680,562, filed Nov. 3, 1967, and Ser. No. 749,843, filed Aug. 2, 1968.

Figure 5:
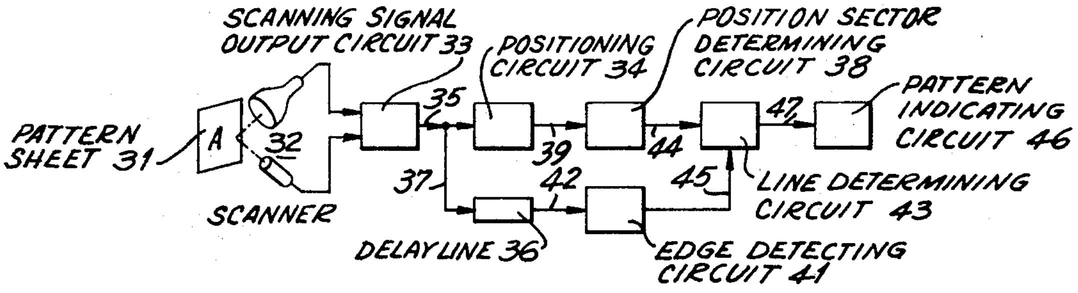
FIG. 5 is a block diagram of a pattern recognizing circuit including the position sector determining circuit of the present invention.

FIG. 5 is a block diagram of a pattern recognizing circuit of the type of the present invention. More particularly, FIG. 5 includes the position or observation sector determining circuit of the present invention. In FIG. 5, a pattern sheet 31 having a pattern or character thereon is scanned by any suitable scanner 32 in a suitable manner. The scanner 32 may comprise, for example, a flying spot 2 and a photomultiplier.

The scanning signals produced by the scanner 32 are supplied by a scanning signal output circuit 33 to a positioning circuit 34 via a lead 35 and to a delay line 36 via the lead 35 and a lead 37. The positioning circuit 34 functions to determine the polygon which encloses the pattern and the delay line 36 functions to delay the scanning signals for a period of time necessary for said positioning circuit to determine said polygon. The output of the positioning circuit 34 is connected to the input of a position sector determining circuit 38 via a lead 39. The output of the delay line 36 is connected to the input of an edge detecting circuit 41 via a lead 42. The position sector determining circuit 38 determines the position or observation sectors and the edge detecting circuit 41 derives four types of edge detecting signals from the scanning signals. The edge detecting signals are, as hereinbefore described, indicative of a variation from black to white and white to black in a vertical direction and from black to white and white to black in a horizontal direction. The edge detecting circuit 41 may comprise any suitable circuit for performing the desired function such as, for example, those disclosed in the aforedescribed copending patent applications.

The output of the position sector determining circuit 38 is connected to an input of a line determining circuit 43 via a lead 44 and the output of the edge detecting circuit 41 is connected to another input of said line determining circuit via a lead 45. The output of the line determining circuit 43 is connected to the input of a pattern indicating circuit 46 via a lead 47. The line determining circuit 43 functions to determine the line segments of the pattern on the pattern sheet 31 by counting and determining the output signals provided by the edge detecting circuit 41 via the observation or position sector provided by the position sector determining circuit 38. The pattern indicating circuit 46 functions to combine the line segment determinations to indicate the complete pattern.

Figure 6:
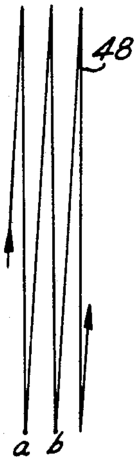
FIG. 6 is a schematic diagram of a scanning pattern.
Figure 7:
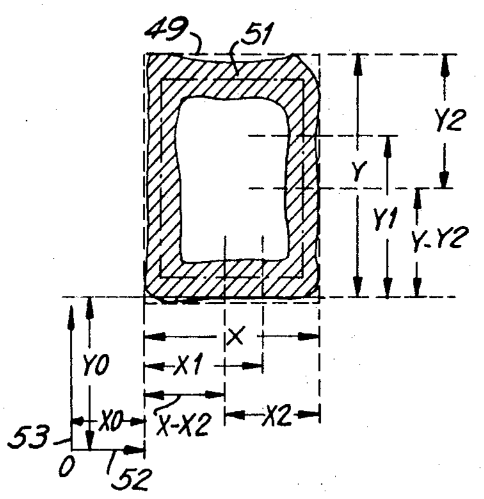
FIG. 7 is a schematic diagram of a pattern illustrating the distances and corresponding times involved in determining the position sector.

The pattern on the pattern sheet 31 is scanned by a scanning pattern 48, as shown in FIG. 6. One scanning cycle or scanning period is determined by the scanning line or pattern 48 from the point *a* to the point *b*. When the direction of the pattern or character, as shown in FIG. 7, and the scanning direction, as shown in FIG. 6, are in their illustrated relationship, it is convenient to determine the enclosing polygon in the scanning area by horizontal and vertical directional measurements. That is, a rectangular parallelogram 49 having two sides which are substantially parallel to the scanning direction, and two sides which are substantially perpendicular to the scanning direction, is properly determined and positioned. The line segments of the pattern 51 enclosed by the parallelogram or polygon 49 are determined by dividing said polygon into observation or position sectors determined with reference to the sides of said polygon. The determination of the positions of the observation sectors is achieved by counters of known type. The position sector determining circuit 38 of the pattern recognizing circuit of FIG. 5 comprises, for example, four counters which perform the aforedescribed four types of distance or dimension determinations, in accordance with the signals supplied thereto from the positioning circuit 34.

FIG. 7 illustrates the operating principle of the counters which determine the position sector. It is assumed that the pattern or character 51 is a delayed character, that is, that said pattern is the output of the delay line 36, so that axes of coordinates 52 and 53 may be utilized therewith, as shown in FIG. 7. The coordinate axis 53 may be considered, with regard to time, as the left edge of the nondelayed pattern or character, or scanning area, and the coordinate axis 52 may be considered, with regard to time, as the under or bottom edge of said pattern or scanning area. The zero origin relates to time.

Figure 8:
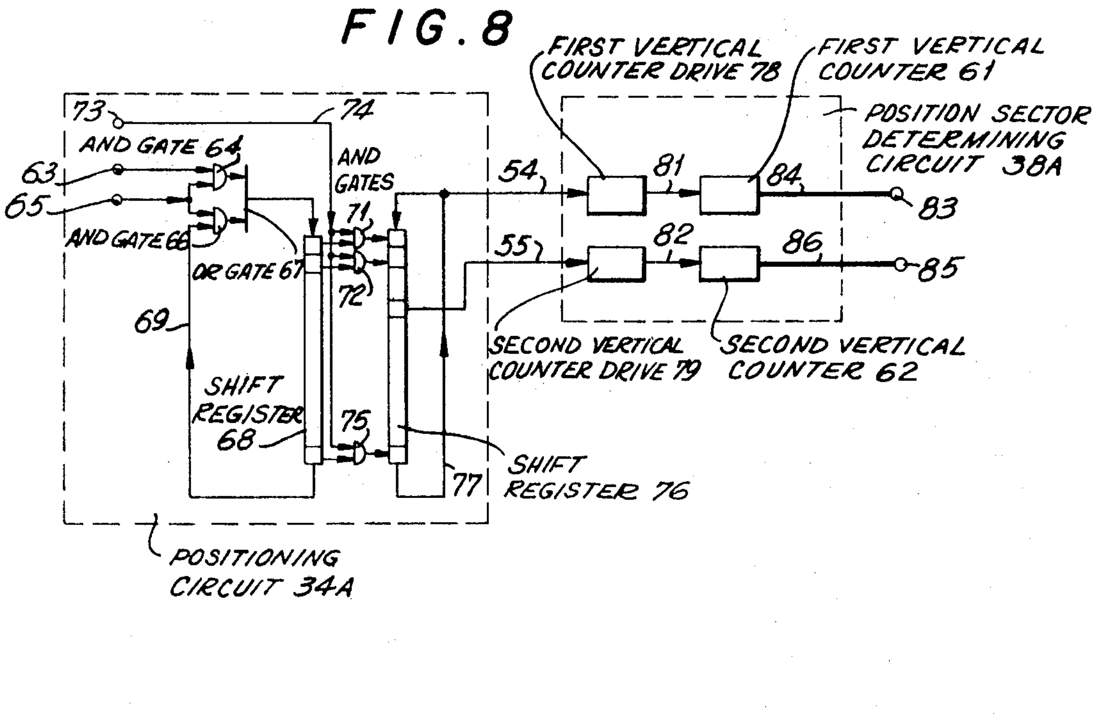
FIG. 8 is a block diagram of an embodiment of the vertical distance determining part of the position sector determining circuit of the pattern recognizing circuit of FIG. 5.
Figure 9:
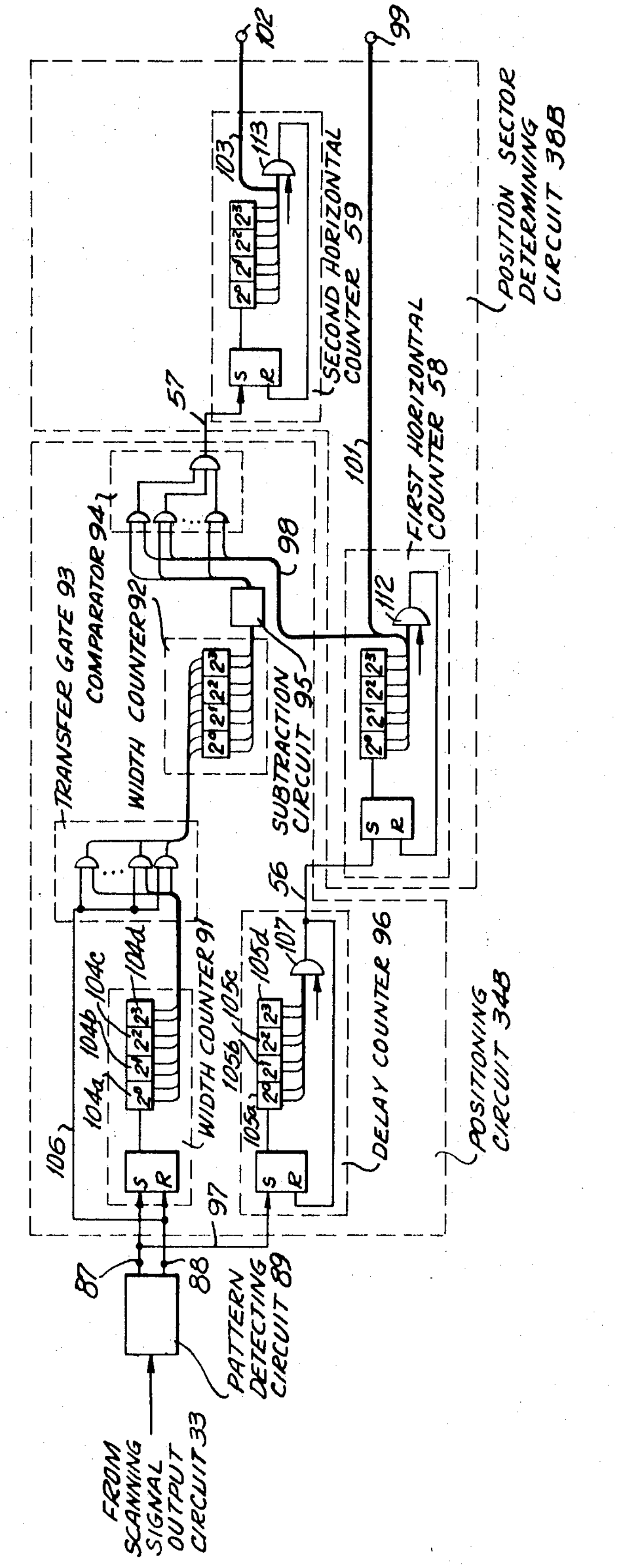
FIG. 9 is a block diagram of an embodiment of the horizontal distance determining part of the position sector determining circuit of the pattern recognizing circuit of FIG. 5.
Figure 12:
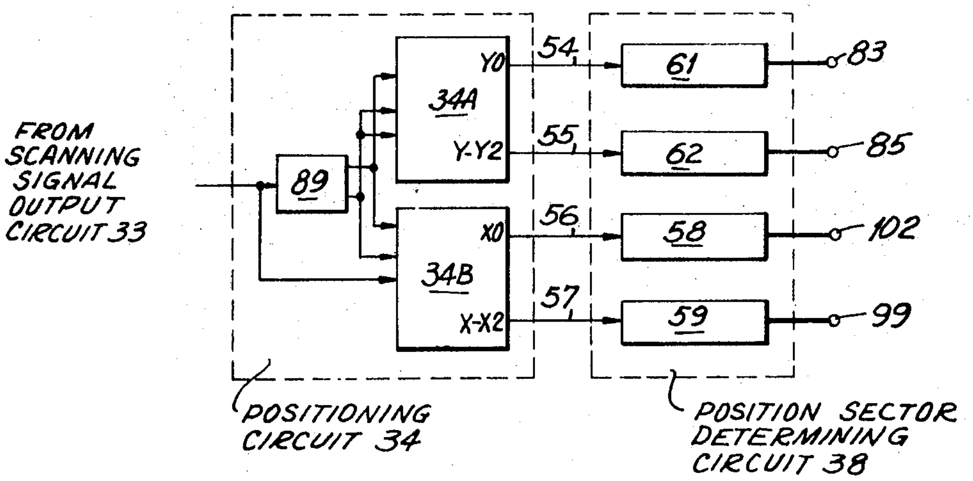
FIG. 12 is a block diagram of the position sector determining circuit of the pattern recognizing circuit of FIG. 5.

The positioning circuit 34 of FIG. 5 determines four time values X0, X–X2, Y0 and Y–Y2, as shown in FIG. 7. The positioning circuit 34 initiates the operation of the four counters of the position sector determining circuit 38 of FIG. 5, from the time incidents X0, X–X2, Y0 and Y–Y2. FIG. 12 illustrates the positioning circuit 34 and the position sector determining circuit 38 of FIG. 5 in block form. FIGS. 8 and 9 illustrate the circuitry of the positioning circuit 34 and the position sector determining circuit 38 of FIG. 5.

In FIG. 8, the time values Y0 and Y–Y2 are determined by a part 34A of the positioning circuit 34 and are provided as time signals in leads 54 and 55. The time values X0 and X–X2 are determined by a part 34B of the positioning sector 34 and are provided as time signals in leads 56 and 57.

In FIG. 9, upon the elapse of the time period X0 from the coordinate axis 53 along the coordinate axis 52 (FIG. 7), a first horizontal counter 58 of a part 38B of the position sector determining circuit 38 of FIG. 5 operates to count the time or dimension X1. When the first horizontal counter 58 reaches the time or position X–X2, a second horizontal counter 59 commences to operate and counts from the time or position X–X2, to a time or position X2. In FIG. 8, upon the elapse of the time period Y0 from the coordinate axis 52 along the coordinate axis 53 (FIG. 7), a first vertical counter 61 of a part 38A of the position sector determining circuit 38 of FIG. 5 operates to count the time or dimension Y1. When the first vertical counter 61 reaches the time or position Y–Y2, a second vertical counter 62 commences to operate and counts from the time or position Y–Y2 to a time or position Y2. The first horizontal counter 58, of FIG. 9, determines the distance from the left side of the polygon 49, the second horizontal counter 59, of FIG. 9, determines the distance from the right side of said polygon, the first vertical counter 61, of FIG. 8, determines the distance from the bottom or under side of said polygon and the second vertical counter 62, of FIG. 8, determines the distance from the upper or top side of said polygon.

FIG. 8 illustrates the vertical position or distance part 34A of the positioning circuit 34 and the vertical positioning or distance part 38A of the position sector determining circuit 38. In FIG. 8, an input terminal 63 is connected to an input of an AND-gate 64. An input terminal 65 is connected in common to an input of an AND-gate 66 and to the other input of the AND-gate 64. The output of the AND-gate 64 and the output of the AND-gate gate are connected as the inputs of an OR gate 67. The output of the OR gate is connected to an input of a shift register 68. The terminal output of the shift register 68 is connected to the other input of the AND-gate 66 via a lead 69.

An intermediate output of the shift register 68 is connected to an input of an AND-gate 71 and a second intermediate output of the said shift register is connected to an input of an AND-gate 72. An input terminal 73 is connected to the other input of the AND-gate 71 and to the other input of the AND-gate 72 via a lead 74. The input terminal 73 is also connected to an input of an AND-gate 75 via the lead 74. The terminal output of the shift register 68 is connected to the other input of the AND-gate 75. The output of the AND-gate 71 is connected to an intermediate input of the shift register 76. The output of the AND-gate 72 is connected to another intermediate input of the shift register 76. The output of the AND-gate 75 is connected to a terminal input of the shift register 76.

The terminal output of the shift register 76 is connected to the input of said shift register via a lead 77. The terminal output of the shift register 76 is also connected to the input of a first vertical counterdrive 78 via the lead 77 and the lead 54. The intermediate output of the shift register 76 is connected to the input of a second vertical counterdrive 79 via the lead 55. The output of the first vertical counterdrive 78 is connected to the input of the first vertical counter 61 via a lead 81. The output of the second vertical counterdrive 79 is connected to the input of the second vertical counter 62 via a lead 82. The outputs of the first vertical counter 61 are connected to an output terminal 83 via leads 84. The outputs of the second vertical counter 62 are connected to an output terminal 85 via leads 86.

The scanning signals from the scanning signal output circuit 33 (FIG. 5) are supplied to the positioning circuit 34A via the input terminal 63. A scanning signal of 1 corresponds to the black portion of the pattern or character and a scanning signal of 0 corresponds to a white or blank area. A logical 1 signal is supplied to the input terminal 65 when the scanning point of the scanner 32 is on the pattern and a logical 0 signal is supplied to said input terminal when the scanning point of said scanner is on a white or blank space. This is identical with the input signal of an input terminal 87 of FIG. 9, as hereinafter described.

The scanning signals are supplied to the input of the shift register via the AND-gate 64 and the OR-gate 67. Information in the shift register 68 advances in synchronism with the scanning of the pattern. The length or duration of the shift register corresponds to one scanning period such as, for example, the length of the scanning line from the point *a* to the point *b* in FIG. 6. During the time that the signals supplied to the input terminal 65 are 1, the scanning signals are repeatedly written into and recorded in the shift register 68.

Except for the case of special signs, when the scanning of the area enclosed by the polygon is completed, the contents of the shift register 68 are such that a series of polygons, including a vertically extending polygon within which the pattern is enclosed, are written in. That is, in one shift register, scanning signals corresponding in number to the number of scanning lines throughout the entire enclosing polygon, are written in and are imposed upon each other.

Upon completion of the scanning of the pattern, a transfer pulse is supplied to the input terminal 73. The transfer pulse is produced upon the completion of scanning of the entire pattern or character enclosing polygon, and is identical with the signal supplied to an input terminal 88 of FIG. 9. The contents of the shift register 68 are then transferred to the shift register 76 through the AND-gate 71, 72 and 75. Then, the signals supplied to the input terminal 65 become 0, so that the contents of the shift register 68 also become 0. The shift register 76 has a length or duration corresponding to that of one scanning period, which is the same as the length or duration of the shift register 68. The contents of the shift register 76 are circulated in synchronism with the scanning of the pattern, while retaining the vertical positions at which the pattern is present.

Figure 10:
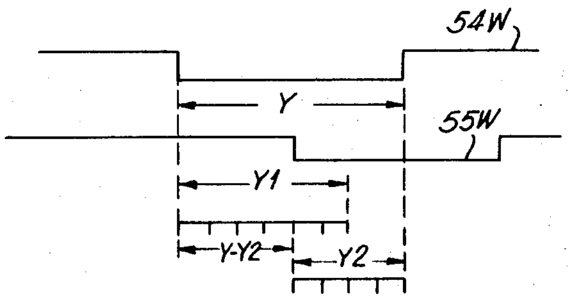
FIG. 10 illustrates various waveforms appearing in the circuit of FIG. 8.

The waveforms of the signals in the leads 54 and 55, which are the output signals of the shift register 76, and which are supplied to the position sector determining circuit 38A, are shown in FIG. 10. The waveform 54W is in the lead 54 and the waveform 55W is in the lead 55. The waveforms 54W and 55W are identical, although they are shifted in time or phase. It is thus possible to conform the waveforms 54W and 55W simply by shifting one of them in time by a period corresponding to Y–Y2.

When the leading edge of the waveform 54W, which is the trailing edge in FIG. 8, is determined or detected, the first vertical counter drive 78 is energized and commences to operate to produce a pulse and to supply such pulse to the first vertical counter 61. The first vertical counter 61 then operates within the time period or distance Y1, and stops. When the leading edge of the waveform 55W, which is the trailing edge in FIG. 8, is determined or detected, the second vertical counterdrive 79 commences to operate to produce a pulse and to supply such pulse to the second vertical counter 62. The second vertical counter 62 then operates within the time period or distance Y2. The intermediate output of the shift register 76 is so designed that the leading or trailing edge of the waveform 55W coincides with the time instant at which the count of the first vertical counter 61 reaches or becomes Y–Y2. The point at which the second vertical counterdrive 79 terminates the operation of the second vertical counter 62 therefore indicates the position of the upper or over side of the pattern or character.

The horizontal counters operate substantially identically to the operation of the vertical counters. FIG. 9 is a block diagram of an embodiment of the horizontal distance determining part of the position sector determining circuit 38. In FIG. 9, the positioning circuit 34B and the position sector determining circuit 38B are connected to the output of the scanning signal output circuit 33 of FIG. 5 via a pattern detecting circuit 89. The pattern detecting circuit 89 is connected to the positioning circuit 34B via the input terminals 87 and 88.

The input terminal 87 and the input terminal 88 are connected to the inputs of a width counter 91. The outputs of the width counter 91 are connected to the inputs of a width counter 92 via a transfer gate 93. The outputs of the width counter 92 are supplied to inputs of a comparator 94 via a subtraction circuit 95. The output of the comparator 94 is connected to the input of the second horizontal counter 59 via the lead 57.

The input terminal 87 is connected to the input of a delay counter 96 via a lead 97. The output of the delay counter 96 is connected to the input of the first horizontal counter 58 via the lead 56. The outputs of the first horizontal counter 58 are connected to other inputs of the comparator 94 via leads 98 and said outputs are connected to an output terminal 99 via leads 101. The outputs of the second horizontal counter 59 are connected to an output terminal 102 via leads 103. The output terminals 83 and 85 of FIG. 8 and 102 and 99 of FIG. 9 are connected as inputs of the line determining circuit 43. (FIG. 5).

The pattern detecting circuit 89 of FIG. 9 produces an output signal which indicates whether the scanning point is on the pattern or character (input terminal 87) or in a blank or white portion where there is no terminal or character (input terminal 88). The width counter 91 counts or determines the period during which the signal supplied to the input terminal 87, which indicates that operation is to commence, is logical 1, and measures the width or time X of the pattern. The width counter 91 comprises four flip flops **104*a*, 104*b*, 104*c* and 104*d***, representing $2^0$, $2^1$, $2^2$ and $2^3$, respectively.

The delay counter 96 provides the starting time X0 of the pattern or character information which is supplied from the delay line 36 of the system of FIG. 5. The delay counter 96 comprises four flip flops **105*a*, 105*b*, 105*c* and 105*d* corresponding to $2^0$, $2^1$, $2^2$ and $2^3$, respectively. Each of the width counter 92, the first horizontal counter 58 and the second horizontal counter 59, similarly to the width counter 91 and the delay counter 96**, comprises four flip flops corresponding to $2^0$, $2^1$, $2^2$ and $2^3$, respectively.

The contents of the width counter 91 are transferred to the second width counter 92 when the scanning of the pattern or character is completed. The transfer of the contents of the width counter 91 is via the transfer gate 93. The transfer gate 93 is in its conductive condition when the output signal of the pattern detecting circuit 89, indicating the termination of the black portion and representing the white or blank area, is supplied to said transfer gate via a lead 106 from said input terminal. On the other hand, at the time instant that the delay counter 96 stops, that is, at the time instant X0, the first horizontal counter 58 commences to operate. The time instant X0 is determined by an AND gate 107.

Figure 11:
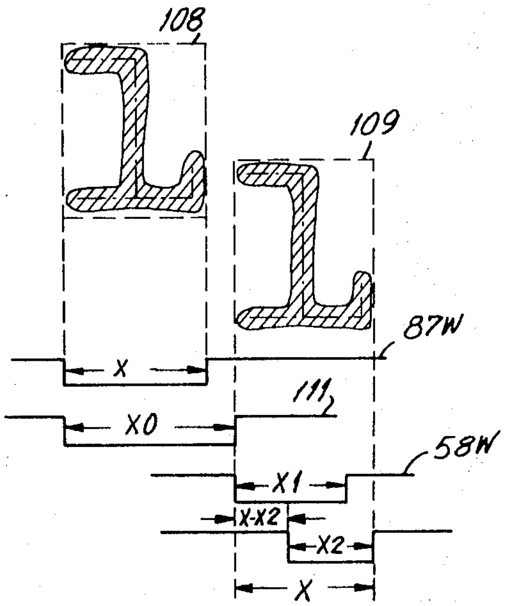
FIG. 11 illustrates various waveforms appearing in the circuit of FIG. 9.

The contents of the first horizontal counter 58 are constantly compared with the contents of the second width counter 92 in a comparator or comparison circuit 94. The contents of the width counter 92 are provided by subtracting X2 from X in the subtraction circuit 95. When the comparator 94 indicates good coincidence between the contents of the second width counter 92 and the first horizontal counter 58, the second horizontal counter 59 commences to operate. These operations are illustrated in FIG. 11, wherein the pattern 108 represents a nondelayed scanning signal and the pattern 109 represents the delayed scanning signal. The waveform 87W of FIG. 11 is the waveform of the output signal of the pattern detecting circuit 89 which is supplied to the input terminal 87 and which indicates the horizontal time period or distance X of the pattern.

The width counter 91 measures or determines the time period X in which the waveform 87W becomes 1. The width counter 91 is designed, however, so that the count thereof is less than the actual width or time period X by the time period or length X2. That is, when the horizontal dimension or width of the pattern or character is X, the count of the width counter 91 becomes X–X2. This may be achieved by setting the contents of the width counter 91 to –X2, not zero, at the reset time of said width counter. The delay counter 96 commences to operate when the leading edge of the waveform 87W (FIG. 11) is determined or detected. The delay counter 96 counts the delay time X0 of the delay line 36 (FIG. 5), as illustrated by the waveform 111 of FIG. 11. The delay counter 96 is so designed that the time instant at which it ceases to count, at the leading edge of the waveform 111, corresponds to the position of the left side of the delayed pattern 109. Simultaneously with the termination of operation of the delay counter 96, the first horizontal counter 58 commences to operate, The operation of the first horizontal counter 58 is illustrated by the waveform 58 of FIG. 11.

When the contents of the first horizontal counter 58 become X–X2, the comparator 94 supplies a coincidence determination signal to the second horizontal counter 59. Actually, the comparator 94 compares the difference of X2 and the contents of the width counter 92 with the contents of the first horizontal counter 58. The first horizontal counter 58 then continues to operate until its count reaches X1. When its count reaches X1, the first horizontal counter 58 terminates its operation. An AND gate 112 determines the time instant at which the count becomes X1.

The second horizontal counter 59 commences to operate upon the supply thereto of the coincidence determination signal from the comparator 94. The second horizontal counter 59 continues to operate until its count reaches X2. An AND-gate 113 of the second horizontal counter 59 determines the time instant at which the count of said second horizontal counter reaches X2. The time or position at which the second horizontal counter 59 ceases its operation corresponds to the right edge of the delayed pattern or character. In FIG. 9, as well as in FIG. 8, the heavy leads indicate eight output leads of the counters.

FIG. 12 indicates the complete position sector determining circuit 38 and the complete positioning circuit 34. In other words, FIG. 12 combines the partial circuits of FIGS. 8 and 9 into a complete circuit.

In the foregoing, the polygon which encloses the pattern or character is indicated as a rectangle having a pair of parallel sides which are parallel with the scanning direction. Furthermore, the division of the enclosed are within the rectangle, relative to each side of said rectangle, is described. It is obvious, however, that this concept may be suitably developed and is equally applicable when the enclosing polygon is not a rectangle but is any other suitable polygon.

While the invention has been described by means of a specific example and in a specific embodiment, I do not wish to be limited thereto, for obvious modifications will occur to those skilled in the art without departing from the spirit and scope of the invention.

I claim

1. A pattern recognizing circuit comprising scanning means for scanning a character and producing scanning signals in accordance with the character; a positioning circuit connected to the scanning means for providing a quadrilateral circumscribed about the character in accordance with he scanning signals; a position sector determining circuit connected to the positioning circuit for providing a plurality of sectors in the quadrilateral and for positioning the sectors by utilizing the four sides of the quadrilateral as a reference, said position sector determining circuit comprising means for measuring the distance between each of the line segments which determine the character and the one of the four sides of the quadrilateral which is parallel to the line segment and nearest to the line segment, said position sector determining circuit producing output signals representing the sectors; an edge detecting circuit coupled to the scanning means for detecting the edges of the character from the scanning signals and for producing edge detecting signals in accordance therewith; a line determining circuit connected to the position sector determining circuit and to the edge detecting circuit for determining the line segments of the character and the positions of the line segments in accordance with the output signals of the position sector determining circuit and the edge detecting signals; and a pattern indicating circuit connected to the line determining circuit for determining the character in accordance with the determinations of the line determining circuit.